US006552831B2

(12) United States Patent
Odhner et al.

(10) Patent No.: US 6,552,831 B2
(45) Date of Patent: Apr. 22, 2003

(54) ACTIVE AND PASSIVE HOLOGRAPHIC OPTICAL BASED CURVED SURFACE ELEMENT

(75) Inventors: Jefferson E. Odhner, Amherst, NH (US); Donald L. Cullen, Columbus, OH (US)

(73) Assignee: Luckoff Display Corporation, Columbus, OH (US)

( * ) Notice: Subject to any disclaimer, the term of this patent is extended or adjusted under 35 U.S.C. 154(b) by 5 days.

(21) Appl. No.: 09/874,635

(22) Filed: Jun. 5, 2001

(65) Prior Publication Data

US 2001/0024303 A1 Sep. 27, 2001

Related U.S. Application Data

(60) Division of application No. 09/430,720, filed on Oct. 29, 1999, now Pat. No. 6,285,472, which is a continuation-in-part of application No. 09/008,015, filed on Jan. 16, 1998, now abandoned.

(51) Int. Cl.⁷ ............................. G03H 1/00; G02B 5/32
(52) U.S. Cl. ............................. 359/15; 359/1; 359/567; 362/806
(58) Field of Search ................................ 359/1, 3, 567, 359/566, 15; 362/806

(56) References Cited

U.S. PATENT DOCUMENTS

| | | | | |
|---|---|---|---|---|
| 4,892,369 A | * | 1/1990 | Moss | 116/202 |
| 5,363,009 A | * | 11/1994 | Monto | 313/110 |
| 5,432,623 A | * | 7/1995 | Egan et al. | 351/41 |
| 6,347,877 B1 | * | 2/2002 | Douglass, II | 359/367 |

* cited by examiner

Primary Examiner—John Juba, Jr.
(74) Attorney, Agent, or Firm—Mueller and Smith, LPA

(57) ABSTRACT

Disclosed is a curved surface element (e.g., light bulb, ornament, light pipe, etc.) which has at least a portion thereof (inner or outer surface) covered with a holographic diffraction grating which was constructed to be essentially distortion free on said curved surface, whereby such diffraction grating diffracts light to emit color to the observer. The diffraction grating can take for form of a holographic optical element (HOE) attached to the curved surface or a diffractive holographic optical pattern (HOP) embossed into the curved surface.

5 Claims, 2 Drawing Sheets

ACTIVE AND PASSIVE HOLOGRAPHIC OPTICAL BASED CURVED SURFACE ELEMENT

CROSS-REFERENCE TO RELATED APPLICATIONS

This application is a divisional application of U.S. Ser. No. 09/430,720, filed Oct. 29, 1999, now U.S. Pat. No. 6,285,472, which is a continuation-in-part of application U.S. Ser. No. 09/008,015, filed Jan. 16, 1998, now abandoned, the disclosures of which are expressly incorporated herein by reference.

STATEMENT REGARDING FEDERALLY SPONSORED RESEARCH

Not applicable.

BACKGROUND OF THE INVENTION

The present invention relations to holiday decorations, such as, for example, Christmas ornaments and lights, and more particularly to such decorations based on holograms.

Conventional Christmas lights typically rely on colored lights or white lights shining through a colored layer in order to generate colors. A Christmas light which could generate a myriad of colors would have an appeal to the market. The same statement can be made of Christmas ornaments. While some ornaments are motorized, color typically is generated by paint or plastic laminates or by illumination with colored lights or white lights shining through a colored layer. Again, Christmas ornaments which are truly multi-colored again would have an appeal to the market.

Holograms offer a technique by which a wealth of information can be displayed optically to an observer. If the hologram is of a diffractive layer and the diffractive layer has its effective spacing changed, then the holographic diffractive layer will generate a multitude of colors to the observer by dint of such grating spacing variation. This color generation is disclosed in U.S. Pat. No. 5,613,022, the disclosure of which is expressly incorporated herein by reference. Other proposals aimed at employing holograms in the decorative fields are summarized below.

U.S. Pat. No. 5,651,741 proposes a golf ball carrying an interference pattern on its outer surface which pattern is formed by holographic recording. Holograms are stated to include Fresnel holograms, Fourier-transform holograms, plane holograms, volume holograms, or the like.

U.S. Pat. No. 5,609,928 proposes a decorative ornament formed from material, which may be holographic, and which is wound around a trapezoidal core and then cut to form thin strips of material in a decorative arrangement. No details on the holographic material are provided.

U.S. Pat. No. 5,294,494 proposes a holographic display formed from two spaced-apart transparent sheets wherein two mirrors overlay portions of the sheets such that reflective surfaces of the mirrors face each other and the first mirror is disposed on the same sheet upon which the holographic plate is mounted and is larger than the second mirror. A light source is disposed between the two sheets.

U.S. Pat. No. 5,293,259 proposes a rainbow hologram formed from a pair of spaced-apart transparent sheets with a light source disposed therebetween with the holographic plate mounted to one of the transparent sheets and a pair of mirrors of different size mounted to reflect the light source.

U.S. Pat. No. 5,155,604 proposes a decorative embossed sheet of a paper which carriers a metal coating which itself carriers a thermoplastic layer which has been embossed with a diffraction or holographic pattern while the thermoplastic layer was heated to soften it.

U.S. Pat. No. 5,121,229 proposes a compact holographic display formed from a light-transmissive plate, a hologram mounted to said plate, and means for illuminating an edge of the plate with a diverging beam of white light where such means are configured such that all reconstructive illumination enters the edge of the plate. The hologram is produced by a 3-step process including recording a first master hologram, recording a second master hologram through reconstruction of an image from a slit-like illumination of the first master hologram and recording the first mentioned hologram through reconstruction of an image from the second master hologram.

U.S. Pat. No. 4,947,299 proposes a decorative lamp having a holographic film pre-recorded with a plurality of holograms of a torch of an illuminator which film is borne by an opening in the shade wherein the torch (e.g., light bulb) illuminates the film to display a plurality of torch images.

U.S. Pat. No. 4,807,971 proposes an optical decorative apparatus which uses a drum-shaped hologram film, light equipment, and a stand having a transparent upper section to display the holographic image.

U.S. Pat. No. 4,725,511 proposes a decorative article formed from a semiconductor layer which has a patterned coating bearing a diffraction grating thereover with a transparent layer over the patterned coating. Watch faces are shown with the decorative article which emits colored light to the observed by dint of the diffraction grating.

U.S. Pat. No. 4,094,575 proposes a hologram composed of a sheet material having a permanent, optically detectable pattern which includes at least one linear grating having a pre-selected spatial frequency formed by the impingement of two mutually coherent beams of radiation along separate paths forming equal angles of incidence with a transparency in substantial contact with a photosensitive medium.

U.S. Pat. No. 2,313,489 proposes to form diffraction gratings into a carrier and then transfer them to a polymeric film in various orientations. A molding material then is placed into contact with the polymeric film to transfer the diffraction gratings to the molding material, for example, glass.

U.S. Pat. No. 4,358,487 proposes an inflatable Christmas ornament that has the appearance of a glass ornament.

U.S. Pat. No. 5,500,311 proposes holographic flake pigments made from an organic polymer and a volume hologram.

U.S. Pat. No. 734,134 proposes to make a flat planar diffractive grating by a ruling engine and transfers this grating onto a film which he then can wrap around a cylindrical glass (see FIG. 5). Such proposal requires multiple steps to get crossed gratings on an object and such gratings are constructed mechanically. This proposal also is limited to parallel lines due to limitations of a ruling engine for any set of gratings. This proposal further is limited to "plane" gratings or overlapping "plane" gratings. In order too transfer the planar gratings to the cylindrical glass, the glass surface must be photosensitive. This proposal requires chemical etching of the glass surface. Chemical etchants for glass, such as hydrofluoric acid, are known to be toxic.

Again, while a variety of decorative holograms have been proposed in the art these holograms have not been specifically applied to lights (e.g., Christmas lights) and Christmas ornaments. Such is an object of the present invention.

BRIEF SUMMARY OF THE INVENTION

The present invention in its broadest aspects relates to the employment of holographic optical elements (HOE), both passively and actively, on curved surfaces which makes the invention especially useful, for example, in the construction of light bulbs (e.g., Christmas lights) and ornaments (e.g., Christmas ornaments). Broadly, then, the present invention can have one or a myriad of small holographic optical elements, which were constructed to be essentially "distortion" free on said curved surface, adhered to an inside or outside curved surface of a light or an ornament. For present purposes, "distortion" is an undesirable wavefront caused by light reflecting off of or transmitting through a curved surface. "Distortion free", then, is the creation of the desired reconstructed wavefront, which may be spherical, cylindrical, etc. When the holographic image viewed is "essentially distortion free", any distortions in the image (colors, alphanumeric characters, graphics) are not readily noticeable by the observer and, if present, are not objectionable to the observer or otherwise adversely affect the viewing of the image.

The distortion free aspect is achieved by the ability of a holographic diffraction grating to have optical "power" associated with it. When the hologram is put on a curved surface, the distortion caused by the curved surface in the diffracted wavefront can be corrected by making the hologram with a wavefront that is the conjugate of the distorted wavefront. The reconstruction of the subsequent hologram will be a plane wave and free of the distortion caused by the curved surface. Alternatively, the distortion can be controlled by how the original hologram is constructed so that the reconstructed wave can be partially spherical or cylindrical in nature. At different viewpoints of the observer, the light or ornament would (reflectively and/or transmissively) emit a rainbow of colors. This sparkling effect could be achieved simply and effectively.

Alternatively, the HOE could be active, such as is achieved in the '022 patent so that movement of the HOE (change in the effective grating spacing of the HOE diffraction grating), such as by piezoelectric elements, magnostrictive elements, magnetic coils, and the like, generates different colors would be emitted to a stationary observer at any location of viewing.

Still further, the HOE could be molded into the Christmas light or ornament, rather than adhesively or otherwise bound thereto. Non-movement of the HOE would still cause the generation of colors passively. Movement of the HOE in the '022 patent manner would cause a color generation by the light or ornament from a white light source (reflective and/or transmissive) in a way not heretofore recognized by the art.

In all aspects of the present invention, however, the HOE or HOP (holographic optical pattern) could be constructed to be distortion free on the curved surface. Thus, it will be seen that the present invention has the ability to provide an entirely new generation of Christmas lights and ornaments. Of course, those skilled in the art will appreciate that the use of the term "Christmas" is for illustration purposes only as a variety of holiday or special occasion or decorative lights and ornaments could be made in accordance with the precepts of the present invention.

Advantages of the present invention include that crossed gratings can be achieved with a single step by exposure of beams at multiple angles which saves manufacturing time. Another advantage is that the gratings are constructed non-mechanically with laser interference (no mechanical wear and tear, faster, lower cost per unit). A further advantage is that the final surface need not be photosensitive as the grating is transferred onto the surface by gluing embossed, for example, Mylar® film (E. I. du Pont de Nemours & Co.) on it or embossing directly into the final surface. A yet further advantage is that conventional etching also can be practiced. A still further advantage is that the grating lines can be any shape and this can provide enhanced color, more spectral variations in color and diffraction angle, and minimized distortion on curved surfaces. Another advantage is that the invention provides unlimited grating types. A still further advantage is that the holographic gratings can be used to compensate for distortions caused by curved surfaces. A still further advantage is that the gratings can have "chirped" spatial frequencies for varying dispersions which makes spherical gratings possible that diffract over 360 degrees. These and other advantages will be readily apparent to those skilled in the art based on the disclosure set forth herein.

BRIEF DESCRIPTION OF THE DRAWINGS

For a fuller understanding of the nature and objects of the present invention, reference should be had to the following detailed description taken in connection with the accompanying drawings in which.

The drawings will be further described below.

DETAILED DESCRIPTION OF THE INVENTION

While holograms and holographic techniques have been applied in a variety of fields, the melding of holography with lights and ornaments, such as used in Christmas trees, is lacking in the art. With the advent of the active diffractive HOE of the '022 patent which can be constructed to change colors with its movement, a variety of possibilities now become available to the designed of lights and ornaments. In a passive mode, the use of diffractive HOEs can be used to advantage to give simple holiday ornaments new life.

Figure 1:
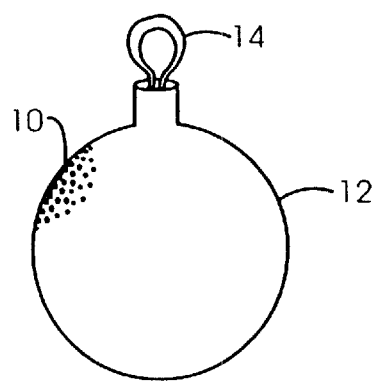
FIG. 1 depicts an ornament which has been coated with a layer of diffractive holographic optical elements (HOE) which very much resembles "glitter"

Thus, in its simplest terms, the present invention includes the use of diffractive HOEs, as at 10, to coat an ornament, such as ornament 12 in FIG. 1 which has loop 14 for a hanger (not shown) for hanging ornament 12 on a Christmas tree, for example. Diffractive HOEs 10 can be thought of as "glitter" because of their small size, say from about 0.1 to 10 mm, and because they diffract light into brilliant colors depending upon the spacing of the diffractive grating from which their holographic optical element was prepared. At least a portion of ornament 12 is coated with HOEs 10, for example, to spell a word or in a graphic. Alternatively, the entire surface (outer or inner) of ornament 12 can be coated, such as by use of a transparent adhesive, with HOEs 10. Either the outside or the inside surface of ornament 12 can be coated with HOEs 10. A different effect will be realized by coating the inside surface of ornament 12 which is transparent. Truly, a unique ornament has been created.

Even in this simple form, the manufacturer typically will make the HOEs in planar form for application to a curved surface element. In order to minimize, if not eliminate, distortions that occur by application of a planar diffraction grating onto a curved surface, the planar HOE must be made with a wavefront that is the conjugate of the wavefront caused by the distorting surface. The resulting hologram would correct for the distortion caused by the curved surface when placed around the curved surface. Ordinary ruling engines cannot be used to prepare such "distorted" planar diffraction gratings to the degree nor accuracy that holographic diffraction manufacturing techniques permit. Thus, even if the curved surface diffraction grating is being etched into a curved surface, holographic diffraction gratings permit the manufacturer to eliminate virtually all distortions evident by the non-linearity and non-planarity of the surface receiving the holographic diffraction grating. This is true for all embodiments of the present invention disclosed herein.

It should be understood that ornament 12 can rely on diffracting incident light or on a light source housed within ornament 12 to back-light HOEs 10 to create even a more brilliant display of color when non-aluminized (transparent) glitter 10 has its focal point at the filament. HOEs 10 can be manufactured to exhibit the same color or a mixture of colors, random or in the form of a pattern, can be used to coat ornament 12. Importantly, use of very small holographic optical elements offers unique advantages over conventional holographic glitter which is plane grating based. It should be appreciated that, while spherical ornaments are shown in the drawings, other configurations of ornaments can be equally used according to the precepts of the present invention so long as such ornaments contain a curved surface (non-planar, curvilinear surface) to which the holographic optical element(s) is applied in accordance with the precepts of the present invention. In this regard, such geometric shapes can include, inter alia, spheres, cylinders, ellipsoids, elliptic paraboloids, hyperbolic paraboloids, hyperboloids, and the like surfaces of revolution.

Figure 2:
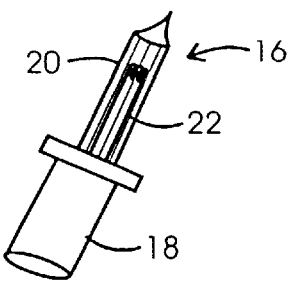
FIG. 2 depicts a light bulb, much like a Christmas tree light, whose globe bears holographic diffractive optics.

FIG. 2 takes the lighted ornament concept one step further by defining the bulb forming ornament 12 as the bulb of a conventional light bulb, such as light bulb 16, which is inserted in socket 18 wherein bulb 16, formed of plastic or glass, bears holographic diffractive optics which diffract light from filament 22 to generate a color corresponding to the grating spacing of the holographic diffractive optics. The holographic diffractive optics could be applied to the exterior of bulb 20 via a film or by a variety of techniques which will detailed below. Of particular note, is the ability to mold diffractive optics into bulb 20 to make an unlit transparent bulb emit color when illuminated by filament 22.

By making the actual bulb envelope (usually glass) carry the holographic pattern, the light source (which serves as the reference beam for the applied hologram) is fixed relative to the holographic diffraction pattern grating which means that if it is designed for light source 16, it will always be at maximum efficiency and require no angle adjustment. Such a light bulb would be efficient because the light is dispersed by the grating on the surface of bulb 16 and, thus, does not have to pass through multiple optical elements, such as fold mirrors and lenses, all of which incur absorption losses on the light. Such a bulb would be compact and inexpensive. Once the mold used to form bulb 16 was modified, no other expense would be incurred in producing as many bulbs as the mold is designed to produce.

To amplify on techniques for accomplishing the foregoing, bulb 20 can be heated up to the point where the glass (or plastic) is in a plastic state at which time a spherical nickel master can be pressed into the glass. The relief grating on the spherical nickel would be transferred into the glass and become permanent as glass bulb 20 cools.

Alternatively, bulb 20 could be covered with a photoresist which then is exposed with a laser in such a way as to create a holographic diffraction pattern in the photoresist. Upon development of the diffraction grating, a relief pattern of the grating would be formed (places where the light constructively interfered creates a peak or valley depending upon whether a positive or negative photoresist was used). After a photoresist pattern has been formed, the glass exposed areas can be ion beam milled into the glass or chemically etched, for example, with perchloric acid or another suitable glass etchant to render the grating permanently into glass bulb 20.

A silver halide (light sensitive) emulsion also could be deposited onto the glass bulb (in a manner similar to the way silver halide emulsions are put onto glass plates), so that, after being exposed with a laser in such a way as to create a holographic diffraction grating, the emulsion could be developed and then would reconstruct when light bulb 16 was turned on.

Figure 3:
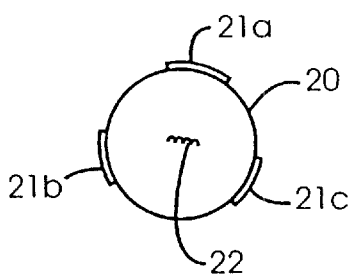
FIG. 3 is an overhead view of a light bulb, like that depicted in FIG. 2, which has reflective strips applied.

In order to enhance the color generated by light bulb 16, aluminized reflector strips 21a–c could be applied to bulb 20 as depicted in FIG. 3. While 3 such reflector strips are shown, it is apparent that a lesser or greater number of such reflector strips could be used as is necessary, desirable, or convenient. A burst of rainbow colors, for example, would then project out of the remaining three non-aluminized reflector slits. The effect of this configuration is that light would be dispersed off of the grating in front of aluminized reflector strips 21a–c and again as the light passes through the non-aluminized slits. Thus, twice the color dispersion is created by this configuration.

Figure 4:
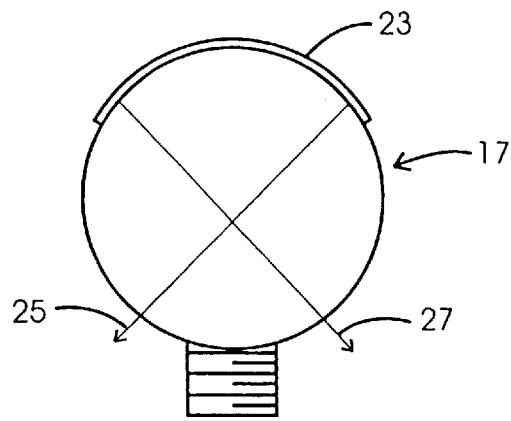
FIG. 4 depicts another light bulb variation where a reflective strip has been applied to the top of the bulb.

As an alternative configuration, reference is made to FIG. 4 where larger transparent light bulb 17 with base 19 contains aluminized reflector area 23 on top of the bulb. The area of bulb 17 underneath reflector area 23 carries a diffraction grating. This bulb configuration would cast normal white light around a room; however, a rainbow of colors would project downwardly from reflector area 23, as at arrows 25 and 27, caused by the diffraction grating. The resulting affect would be stunning on a white carpet.

Doubtless, the skilled artisan would be able to evolve a variety of additional configurations of light bulbs based on the precepts of the present invention. Regardless of the technique used to form the holograph diffraction pattern into bulb 16 or 17, a truly novel light bulb has been disclosed.

Figure 5:
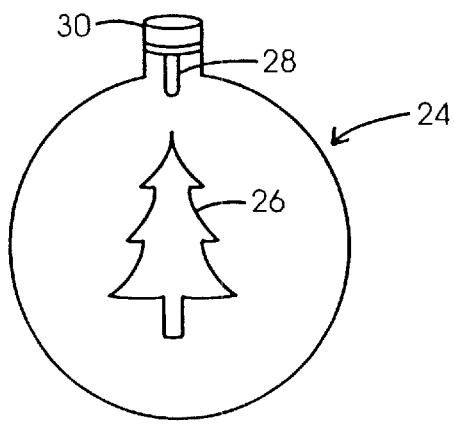
FIG. 5 depicts a transparent ornament which has a holographic image generated by a hologram that has been deposited on the external side of the bulb via embossing techniques or internally via photographic technique.

Referring to FIG. 5, transparent bulb 24 generates holographic image 26 by a hologram that is deposited on the external side of bulb 24 via embossing techniques, or internally via photographic techniques, for example. Light or filament 28 mounted in stem 30 (or within bulb 24 itself) would illuminate the hologram to generate image 26. In fact, multiple holograms could be deposited on bulb 24 to generate different images depending upon which side of bulb 24 is viewed. In fact, by mounting a motor in stem 30, bulb 24 could rotate to reveal the multiple images carried by the deposited holograms in order to yield a dynamic display. It should be understood that the reconstructed image, image 26, could appear to be inside bulb 24, straddle bulb 24, or project outside of bulb 24. Alternatively, if the bulb filament, e.g., light or filament 28, illuminates the hologram such that is in the conjugate direction of the originally exposed hologram, then a "real" image would project out of the light and onto a wall or a lampshade, for example.

Figure 6:
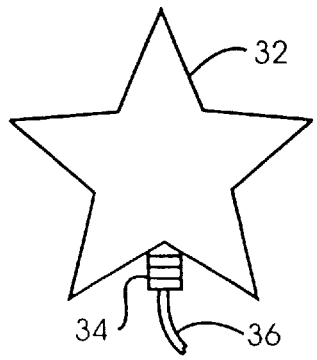
FIG. 6 depicts a star, such as intended to top a Christmas tree, whose front surface bears a diffractive HOE which is associated with double-sided magnetic coils and spaced-apart magnets for movement of the star and, hence, color change of the star.
Figure 7:
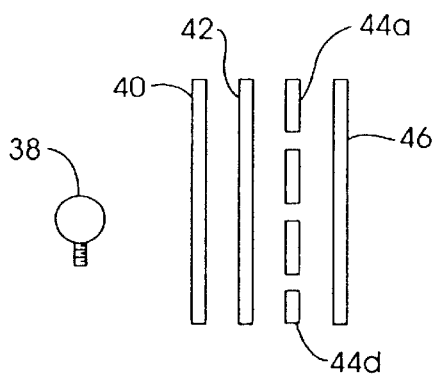
FIG. 7 is a side view of the star of FIG. 6 depicting the HOE and associated magnetic drive assembly.

Referring to FIGS. 6 and 7, a Christmas tree topper in the form of star 32 has annular stem 34 to fit over a Christmas tree branch and as an outlet for electrical line cord 36 for illuminating a, say, halogen lamp 38 (see FIG. 7). The front surface of star 32 is holographic diffraction grating 40 which has been adhesively bound to, say polymeric sheet 42, which can be made of Kaptone polymer which has been fitted with a multitude of magnetic coils on both sides of sheet 42. Magnets 44a–d are spaced-apart from sheet 42. Finally, random noise oscillator 46 exhibits time delays to each coil on sheet 42. As an oscillating voltage is applied to sets of coils. That area of the star where the coils are charged changes color due to the change in effective grating spacing from, say, red to green to blue. If the frequency is fast enough, the coil will be white in color (all colors combined). Alternatively, the movement of the diffraction grating could be accomplished with a piezoelectric bimorph material made of piezoelectric film, such as Kynar® film (Pennwalt Corp.). A grating applied to the surface of the bimorph moves to create different colors when a voltage is applied to the bimorph material. It should be appreciated that drive mechanisms other than magnetic could be used, e.g., mechanical, bimorph, etc.

Figure 8:
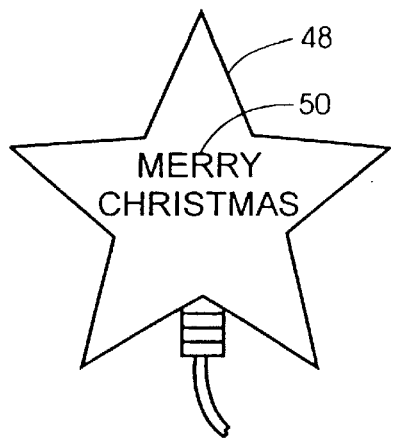
FIG. 8 is another tree-topper star which bears an array of diffractive HOE pixels for displaying messages.

Referring to FIG. 8, star 48 bears an array of pixels of diffractive HOEs as shown, for example, in the '022 patent. By selective energizing of various coils to activate a color change of a pixel, alphanumeric messages, such as message 50, MERRY CHRISTMAS, graphics can be displayed by star 48. For example, blue colored star 48 could have the pixels change color to, say, red upon coil activation to display a red message on a, say, blue background. Upon cessation of the voltage to the coils, the entire star would revert to a blue color.

Figure 9:
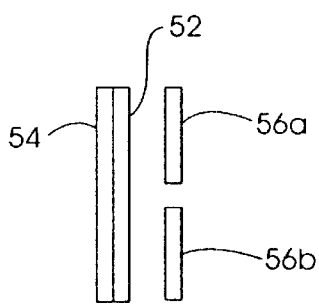
FIG. 9 a variant HOE and associated magnetic drive assembly from that shown in FIG. 7.

Either star 32 or 48 also could be fitted with the drive assembly shown in FIG. 9 where the Kapton® double coil sheet 52 (E. I. du Pont de Nemours & Co.) would be adhesively bound to holographic diffraction grating 54 with sheet magnets 56a and b spaced-apart therefrom. The grating-coil assembly moves back and forth in the air space between the grating-coil unit and the magnet pair to produce color. If audio is applied to the coils, then they become a speaker (see '022 patent in this regard) so that both color and audio is being generated by the star fitted with such assembly. The pattern could be, for example, concentric stars so that it would appear as if star 32 or 48 would be moving in and out as, for example, Christmas music is playing. Again, it should be appreciated that drive mechanisms other than magnetic could be used, e.g., mechanical, bimorph, etc.

Another curved surface amenable to the precepts of the present invention is a fiber optic strand or flexible plastic (polymeric) tube. The fiber or flexible plastic strand should be large enough in diameter to permit multiple modes to pass through the fiber, e.g., greater than about 5 microns in diameter, so that when a white light source is injected into one end of the fiber, a diffraction grating on the curved surface of the outside of the fiber will cause a portion of the light which passes through the fiber to be diffracted into a rainbow of colors along the length of the fiber. The effect is a strand of rainbow color which extends along the length of the fiber. Such a strand could be used, for example, to decorate a Christmas tree, as general indoor or outdoor decoration where colors are desired, or as signage.

Figure 10:
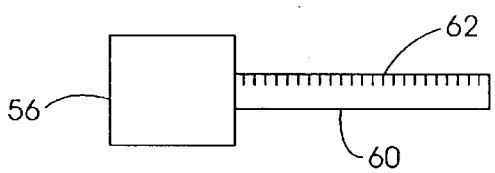
FIG. 10 is a rainbow fiber light pipe where a diffraction grating has been embossed onto a light pipe for generation of a rainbow color.
Figure 11:
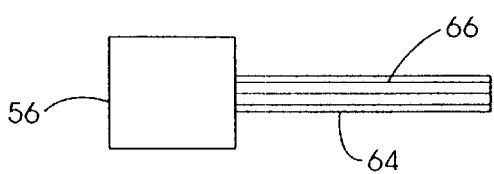
FIG. 11 is an alternative configuration of the rainbow fiber light pipe of FIG. 10 where the grating is incorporated into the die for forming the grating during the extrusion process.

The preferred configuration has the grating covering only a portion of the outside of the fiber so that, while part of the light is diffracted out of the fiber, a larger portion of the light continues to propagate down the fiber to be diffracted out of the fiber at a later point along its length. Referring to FIG. 10, white light source 58 is connected to flexible fiber optic cable 60. Grating 62 has been embossed onto light pipe 60, for example, directly after the extruder with a wheel which has the grating on the outside of it. Diffraction grating 62 can be continuous the length of cable 60 or can be discontinuous. In FIG. 11, grating 66 can be incorporated into the extruder die to be a portion of the inside of the die for transfer to light pipe 60.

The most dramatic effect may be achieved with large diameter light pipes, say, from about 6 mm to 10 mm solid plastic flexible pipes. Alternatively, a similarly large diameter pipe could be cast in a solid acrylic mold where the grating is incorporated into the mold to make dramatic signage to, perhaps, replace neon signs. Key to the light pipe embodiment of the present invention is the application of a diffraction grating (mechanical or holographic) to a curved surface (glass or plastic).

From the foregoing description, it will be appreciated that a wide variety of additional embodiments of the present invention are possible based upon the precepts of the present invention disclosed herein. All citations are expressly incorporated by reference herein.

What is claimed is:

1. A curved surface element, which comprises a bulb having lengthwise extent and inside of which is disposed a light source, wherein said bulb retains a holographic optical element (HOE) diffraction grating along its lengthwise extent adjacent a reflective strip which runs along its lengthwise extent, said HOE diffraction grating being constructed so that is it essentially distortion free when applied on said bulb, whereby said HOE diffraction grating diffracts light to emit color to an observer.

2. The curved surface element of claim 1, wherein there are more than one set of alternating diffraction patterns and reflective strips.

3. The curved surface element of claim 2, wherein said reflective strips are aluminized strips.

4. The curved surface element of claim 1, wherein said reflective strip is an aluminized strip.

5. The curved surface element of claim 1, wherein said bulb is glass or plastic.

* * * * *